Patented May 5, 1953

2,637,717

UNITED STATES PATENT OFFICE 2,637,717

METHOD OF PREPARING BLENDED POLYMERS

Costas H. Basdekis, Dayton, Ohio, assignor, by mesne assignments, to The Chemstrand Corporation, a corporation of Delaware No Drawing. Application May 26, 1950, Serial No. 164,628

19 Claims. (Cl. 260—45.5)

This invention relates to methods of preparing specific blends of polymers of acrylonitrile. More specifically the invention relates to methods of preparing dyeable fiber-forming acrylonitrile polymers from non-dyeable acrylonitrile polymers.

It is well known that excellent fibers can be prepared from copolymers of 80 or more per cent acrylonitrile and up to 20 per cent of other monomers, such as vinyl acetate and other vinyl esters of mono-corboxylic acids, styrene and other vinyl substituted aromatic hydrocarbons, methyl acrylates and other alkyl esters of acrylic acid, methyl methacrylate and other alkyl esters of methacrylic acid, dialkyl fumarate and other dialkyl esters of fumaric acid, diethyl maleate and other dialkyl esters of maleic acid, vinyl chloride and other vinyl halides and vinylidene chloride. These copolymers are inherently objectionable as fiber raw material because they do not have sufficient dyestuff receptivity for practical purposes.

It has been proposed to prepare dyeable fibers by blending with the fiber-forming acrylonitrile polymers, small portions of polymer chemically reactive with dyestuffs. Suitable useful blending compositions are the polymers of vinylpyridine, other vinyl substituted N-heterocyclic compounds, or other polymerizable olefinic compounds containing tertiary amino radicals. In this manner the thermostability of the high acrylonitrile polymers, as well as other physical and chemical properties thereof, are retained, and the dye receptivity properties of the added polymers are acquired. In order to develop dye receptivity to the desired extent, sufficient added polymers or polymers containing a sufficient number of tertiary nitrogen groupings should be used.

An especially useful class of blending compositions are the polymers of more than 20 per cent of a tertiary amine containing a polymerizable carbon to carbon double bond and up to 80 per cent of another olefinic monomer copolymerizable therewith. These copolymers may be prepared from a wide variety of polymerizable monomers, including 2-vinylpyridine, 4-vinylpyridine, 5-ethyl-2-vinylpyridine, 5-methyl-2-vinylpyridine, vinyl quinoline, vinylthiazole, vinylbenzothiazole, vinylpyrimidine, allylpyridine, metallylpyridine, allyl quinoline, methallyl quinoline, N-dimethylaminoethyl acrylate, N - dimethylaminoethyl methacrylate, and homologues thereof.

The blending operation may be performed by mechanically mixing the solid polymers in conventional mixing machinery. However, it has been found desirable to use a substance which is a solvent for both the acrylonitrile fiber-forming polymers and the blending polymers. Solvents, such as N,N-dimethylformamide, ethylene carbonate, butyrolactone and N,N-dimethylacetamide are suitable for this purpose. Since water will prevent the dissolution of the polymer in the solvent and will precipitate the polymers from solutions thereof, a substantially complete elimination of water from both the base fiber polymer and the blending polymer is essential.

Although the fiber-forming acrylonitrile polymers, and especially those in which the acrylonitrile exceeds 90 per cent, are usually prepared in a granular form which can be separated from the aqueous phase by simple filtration operations, the blending polymer of the preferred type, derived by the polymerization of tertiary amines containing polymerizable olefinic groups cannot be prepared in the form of filterable dispersions. Thus, an expensive drying operation, necessitated by the 70 to 80 per cent water content of the emulsion, or a separate coagulation operation, which usually introduces impurities, is required. Often the evaporation procedures result in overheating and discoloration of the polymer. Accordingly, the practice of the prior art presents series industrial problems.

The primary purpose of this invention is to provide a simple and economical method of blending acrylonitrile fiber-forming polymers with the dyeable polymers of an olefinic compound containing tertiary amino groups. A further purpose of this invention is to provide a practicable means of eliminating water from the basic blending polymer. A still further purpose of the invention is to provide a new method of preparing dyeable acrylonitrile fiber-forming polymers.

In accordance with this invention it has been found that, when the fiber-forming polymer dispersions of copolymers of 90 per cent or more of acrylonitrile are used, a useful and economical method of blending polymers is available. These fiber-forming polymers are prepared in an aqueous medium in the presence of an alkali metal salt of a peroxy acid, such as sodium persulfate, potassium persulfate or another peroxy acid which is reduced to a strong acid, for example an acid having a dissociation constant less than $10^{-2}$, during the polymerization reaction. Often, especially when water:monomer ratios as low as 2:1 are used, it is desirable to introduce to the reaction mass a small amount of an anionic dispersing agent which is stable in a slightly acid solution. Suitable dispersing agents are the alkali metal salts of strong acids, such as alkylarylsulfonic acids. The function of the dispersing agent is to keep the particles of polymer from agglomerating and adhering to the walls of the reactor. When very low water to monomer ratios are used the dispersing agent is often necessary; however, at higher water to monomer ratios no dispersing agents are required. The resulting dispersions are suspensions of finely divided polymer of uniform physical and chemical characteristics in an aqueous medium, the two phases of which can readily be separated by simple filtering operations.

It has been found that the stable emulsions prepared in the normal polymerization of the polymer of the described basic monomers, the olefinic tertiary amines, can be precipitated and blended simultaneously by contacting them with the acidic dispersion of the high acrylonitrile polymers.

The emulsion polymers of the olefinic tertiary amine monomers are effectively prepared in an aqueous medium having a pH in excess of 7, which is maintained by a substantial proportion of an anionic emulsion stabilizer of a basic type, for example, the alkali metal salts of weak acids, for example sodium oleate, sodium stearate or the corresponding potassium salts of other weak acids, especially those having long alkyl chains of hydrophobic nature. Often polymerizations in the alkaline media involve the use of persulfate catalysts which generate strong acids during polymerization, for example potassium persulfate and sodium persulfate. When catalysts of this type are used it is necessary to use a preponderance of the alkaline stabilizing agent in order to maintain the polymerization reaction in a continuous alkaline medium. If desired, the presence of an alkaline medium may be assured by the use of buffer salts of alkaline reaction, for example sodium bicarbonate, sodium carbonate, trisodium phosphate or sodium acetate. These buffer salts serve to neutralize the strong acid which may be generated by decomposition of the catalyst. The failure to maintain an alkaline medium may result in the agglomeration of the polymer or even the total coagulation of the mass, either case of which the polymers cannot be effectively handled and processed into satisfactory polymers.

The mixing of the emulsion of the blending polymers with the dispersion of the fiber-forming polymers will cause a simultaneous precipitation and separation into an intimately blended polymer mass which can readily be separated from the aqueous medium by conventional filtration procedures. The polymers so prepared will contain a minor proportion of water, which may readily be removed by simple drying operations.

The polymers prepared in accordance with this invention may be dissolved in a suitable solvent, for example N,N-dimethylformamide, N,N-dimethylacetamide, ethylene carbonate, butyrolactone and N,N-dimethylmethoxyacetamide. From these solutions, usually of five to 25 per cent solids, synthetic fibers of desirable physical properties can be prepared in accordance with procedures well known to the art.

The procedure of this invention is a convenient, inexpensive and industrially practicable procedure for simultaneously separating the polymer from the aqueous emulsion and intimately blending the two solid phases. The emulsion mixing procedure may be conducted at room temperatures or at higher temperatures, for example the polymerization temperature of either of the polymers. The mixing may take place by merely pouring the emulsion into the dispersion which is usually the larger volume, or it may involve the use of mechanical stirring devices. In the latter case the mixing may take place in an open tank at room temperatures, or the blending may take place at an elevated temperature, for example in a closed retort, if desired the one in which the dispersion is prepared.

Further details of the preparation of this invention are set forth with respect to the following examples.

Example 1

A copolymer of 97 per cent acrylonitrile and three per cent vinyl acetate was prepared by heating a reactor containing 900 parts of water and 0.45 part of a sodium salt of a formaldehyde condensed alkylnaphthalene sulfonic acid. A separate vessel was then charged with 450 parts of the monomers in the desired proportion. The monomers were added to the heated aqueous mixture over a two hour period, with constant stirring. A solution of 4.5 parts of potassium persulfate was also added continuously over the same two hour period. The temperature was maintained at reflux temperature throughout the reaction. After all of the monomers and catalyst had been added to the flask the reaction was continued at reflux temperature for one-half hour. At this time the reaction was essentially complete, having converted the monomer to polymer in excess of a 98 per cent yield. The aqueous slurry was found to have a pH of 5.3.

Example 2

A stirred reactor was charged with 850 parts of water and six parts of potassium oleate. While heating at the reflux temperature a separately prepared mixture of 150 parts acrylonitrile, 150 parts of vinylpyridine, 1.5 parts of potassium persulfate and 1.5 parts of sodium bicarbonate were added continuously at a uniform rate over a two hour period. After all of the reactants had been combined the reaction was continued for one-half hour to effect a substantial completion in excess of 95 per cent. The resulting emulsion was very stable to agitation and was found to have a pH of 8.5.

Example 3

Ninety parts by weight of the slurry prepared in accordance with the procedure of Example 1, was charged into a reactor at a temperature of about 50° C. Ten parts of the emulsion prepared in accordance with Example 2, and which contained 25 per cent copolymer, was added to the reactor continuously over a ten minute period. The resulting mixture was filtered through a Büchner funnel. The filtrate was perfectly clear indicating that the emulsion was totally coagulated.

The blended polymer was dried and dissolved in N,N-dimethylacetamide to form a good solution. Fibers prepared by spinning through a conventional spinneret into a bath containing substantial portions of water and N,N-dimethylacetamide. The fibers so prepared were found capable of being dyed effectively with acid dyestuffs.

The invention is defined by the following claims. I claim:

1. A method of preparing a mixture of polymers, which comprises mixing (a) an aqueous slurry of a polymer of at least 90 per cent acrylonitrile prepared in an aqueous medium in the presence of sufficient alkali metal salt of a peroxy acid to render the resultant dispersion acidic, and (b) aqueous emulsion of a polymer of at least 15 per cent of a tertiary amine containing a polymerizable carbon to carbon double bond, said emulsion being stabilized by the presence of a basic anionic wetting agent and separating the precipitated polymer blend.

2. The method of preparing mixed polymers in accordance with claim 1, wherein the aqueous emulsion contains in suspension a copolymer of 30 to 80 per cent of acrylonitrile and 20 to 70 per cent of vinylpyridine.

3. A method of preparing a mixture of polymers, which comprises mixing (a) an aqueous slurry of a polymer of at least 90 per cent acrylonitrile prepared in the presence of water, having a pH of less than 7, and (b) an aqueous emulsion of a polymer of at least 15 per cent of a tertiary amine containing a polymerizable carbon to carbon double bond prepared in an aqueous emulsion stablilized by the presence of a basic anionic wetting agent, and separating the precipitated polymer blend.

4. A method of preparing a mixture of polymers, which comprises mixing (a) an aqueous slurry of a polymer of at least 90 per cent acrylonitrile prepared in the presence of water, having a pH of less than 7, and (b) an aqueous emulsion of a copolymer of from 30 to 80 per cent acrylonitrile and from 20 to 70 per cent of a tertiary amine containing a polymerizable carbon to carbon double bond prepared in the presence of an aqueous medium stabilized by the presence of a basic anionic wetting agent, and separating the precipitated polymer blend.

5. The method defined by claim 1, wherein (b) is a polymer of 2-vinylpyridine.

6. The method defined by claim 1, wherein (b) is a polymer of 4-vinylpyridine.

7. The method defined by claim 1, wherein (b) is a polymer of 5-ethyl-2-vinylpyridine.

8. The method defined by claim 1, wherein (b) is a polymer of 5-methyl-2-vinylpyridine.

9. The method defined by claim 1, wherein (b) is a polymer of vinyl quinoline.

10. A method of preparing a mixture of solid polymers, which comprises adding an aqueous emulsion of a polymer of at least 15 per cent of a tertiary amine containing a polymerizable carbon to carbon double bond to an aqueous slurry of a polymer of at least 90 per cent acrylonitrile prepared in the presence of water and sufficient alkali metal salt of a peroxy acid to render the resultant dispersion acidic, and separating the precipitated polymer blend, said aqueous emulsion being stabilized by the presence of a basic anionic wetting agent.

11. A method of preparing a mixture of solid polymers, which comprises adding with constant agitation, an aqueous emulsion of a polymer of at least 15 per cent of a tertiary amine containing a polymerizable carbon to carbon double bond to an aqueous slurry of a polymer of at least 90 per cent acrylonitrile prepared in the presence of water and sufficient alkali metal salt of a peroxy acid to render the resultant dispersion acidic, and separating the precipitated polymer blend, said aqueous emulsion being stabilized by the presence of a basic anionic wetting agent.

12. A method of preparing a mixture of solid polymers, which comprises adding at elevated temperatures, an aqueous emulsion of a polymer of at least 15 per cent of a tertiary amine containing a polymerizable carbon to carbon double bond to an aqueous slurry of a polymer of at least 90 per cent acrylonitrile prepared in the presence of water and sufficient alkali metal salt of a peroxy acid to render the resultant dispersion acidic, and separating the precipitated polymer blend, said aqueous emulsion being stabilized by the presence of a basic anionic wetting agent.

13. A method of preparing a mixture of solid polymers, which comprises adding with constant agitation and elevated temperatures, an aqueous emulsion of a polymer of at least 15 per cent of a tertiary amine containing a polymerizable carbon to carbon double bond to an aqueous slurry of a polymer of at least 90 per cent acrylonitrile prepared in the presence of water and sufficient alkali metal salt of a peroxy acid to render the resultant dispersion acidic, and separating the precipitated polymer blend, said aqueous emulsion being stabilized by the presence of a basic anionic wetting agent.

14. A method of preparing a mixture of solid polymers, which comprises adding an aqueous emulsion of a copolymer of 30 to 80 per cent acrylonitrile and 70 to 20 per cent of a tertiary amine containing a polymerizable carbon to carbon double bond to an aqueous slurry of a polymer of at least 90 per cent acrylonitrile prepared in the presence of water and sufficient alkali metal salt of a peroxy acid to render the resultant dispersion acidic, and separating the precipitated polymer blend, said aqueous emulsion being stabilized by the presence of a basic anionic wetting agent.

15. The process defined by claim 14, wherein the aqueous emulsion is a copolymer of 2-vinylpyridine.

16. The process defined by claim 14, wherein the aqueous emulsion is a copolymer of 4-vinylpyridine.

17. The process defined by claim 14, wherein the aqueous emulsion is a copolymer of 5-ethyl-2-vinylpyridine.

18. The process defined by claim 14, wherein the aqueous emulsion is a copolymer of 5-methyl-2-vinylpyridine.

19. The process defined by claim 14, wherein the aqueous emulsion is a copolymer of vinyl quinoline.

COSTAS H. BASDEKIS.

References Cited in the file of this patent

UNITED STATES PATENTS

| Number | Name | Date |
|---|---|---|
| 1,989,246 | Reed | Jan. 29, 1935 |
| 2,402,020 | Cislak et al. | June 11, 1946 |
| 2,436,926 | Jacobson | Mar. 2, 1948 |
| 2,486,241 | Arnold | Oct. 25, 1949 |
| 2,527,863 | Webb | Oct. 31, 1950 |

OTHER REFERENCES

Bacon et al., Proceedings of Rubber Technology Conference, London 1938, p. 525-529.